United States Patent

[11] 3,544,010

[72] Inventor Marius Jurdyc
Bel Air, Chabris, Indre, France
[21] Appl. No. 744,408
[22] Filed July 12, 1968
[45] Patented Dec. 1, 1970

[54] MOBILE DRUM FOR DISTRIBUTING AND SPRAYING
4 Claims, 7 Drawing Figs.
[52] U.S. Cl..................................................... 239/168;
239/172; 103/12; 230/11;
[51] Int. Cl..................................................... B05b 1/20
[50] Field of Search........................................... 239/167,
172, 168; 103/11, 12; 230/38, 11

[56] References Cited
UNITED STATES PATENTS
2,313,205 3/1943 Potez............................ 230/11X 2,975,978 3/1961 Propst III..................... 239/172X
FOREIGN PATENTS
1,087,667 8/1954 France........................... 239/172
1,342,340 9/1963 France........................... 239/172

Primary Examiner—M. Henson Wood, Jr.
Assistant Examiner—Michael Y. Mar
Attorney—McGlew and Toren ABSTRACT: A wheeled drum for distributing liquid manure or for spraying liquid fertilizers, herbicides, plant protectants and the like. The drum is equipped with an air compressor having two operative speeds, namely a speed for distributing at a high rate of delivery and low pressure and a speed for spraying at a lower rate of delivery and high pressure, an adjustable safety valve, a distributing nozzle, articulated spray bars in communication with the interior of the drum and a filter opening fitted with a removable leak-tight plug.

Patented Dec. 1, 1970
3,544,010
Sheet 1 of 3
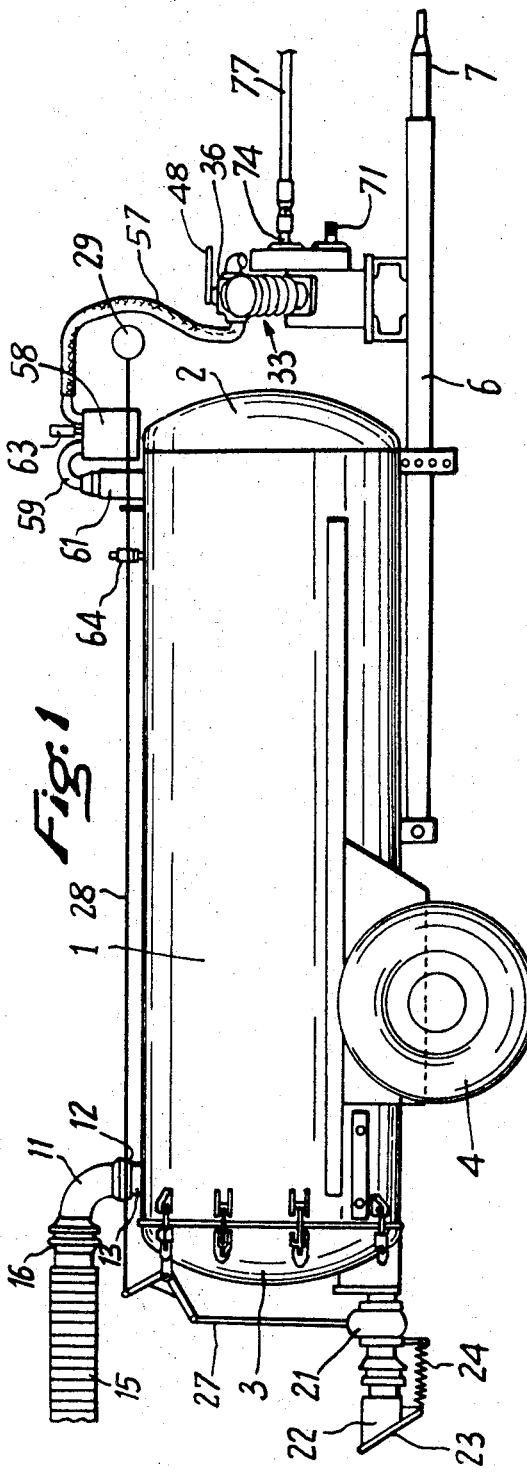
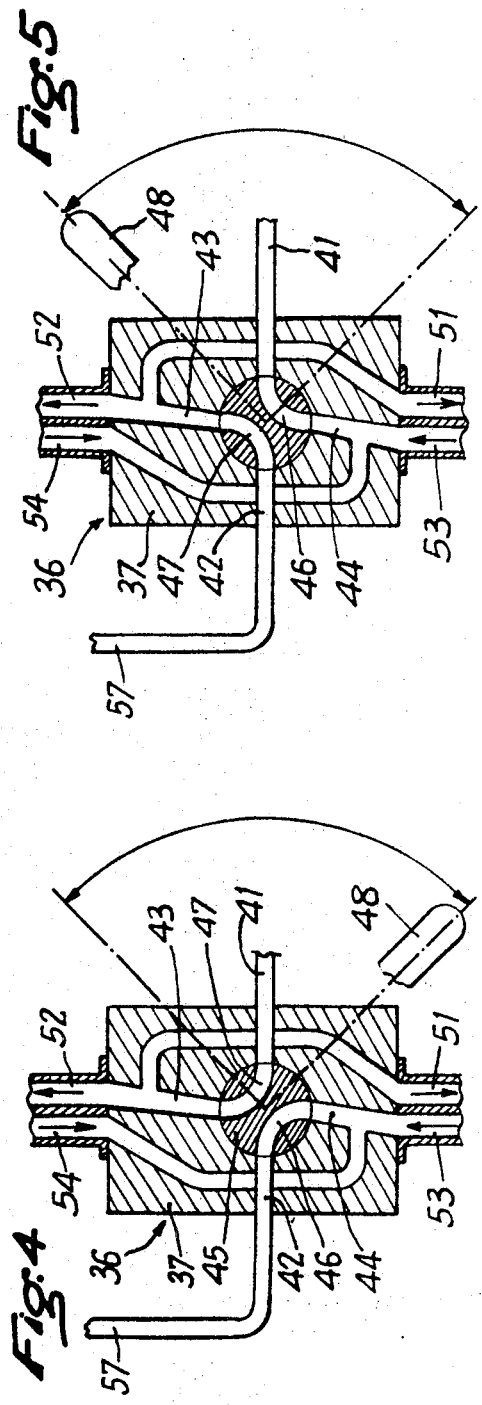
INVENTOR
MARIUS JURDYC
BY Mackler and Toren
attorneys

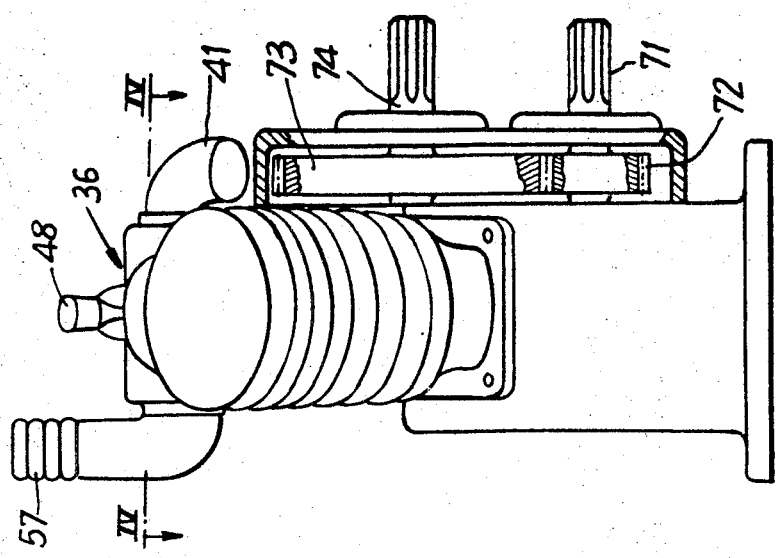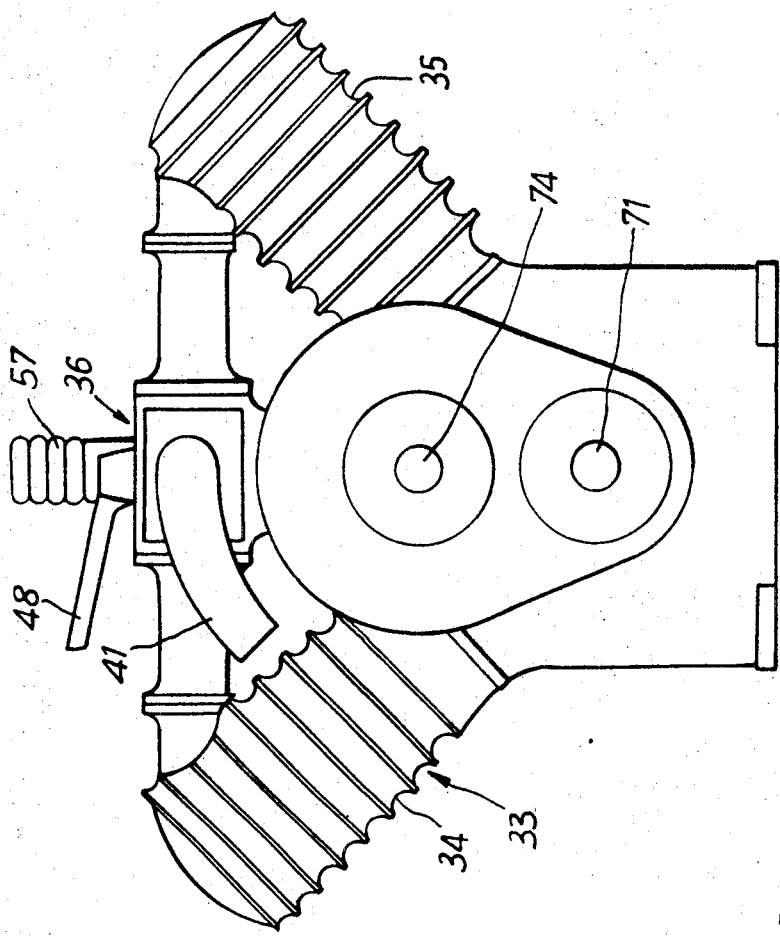

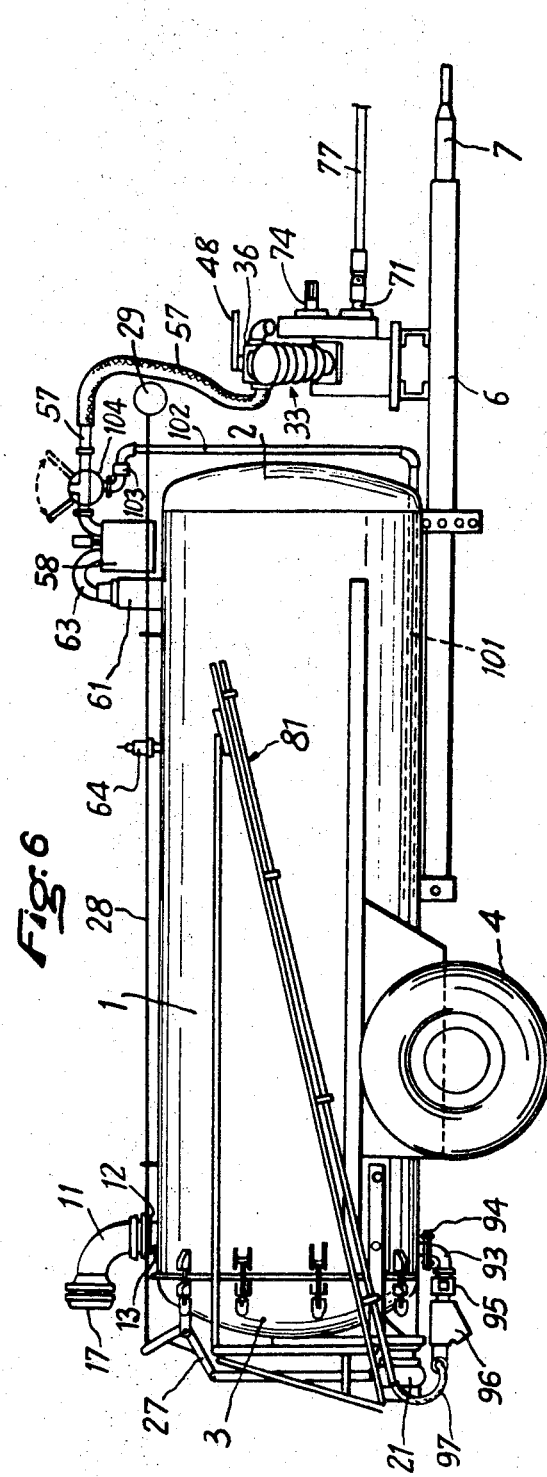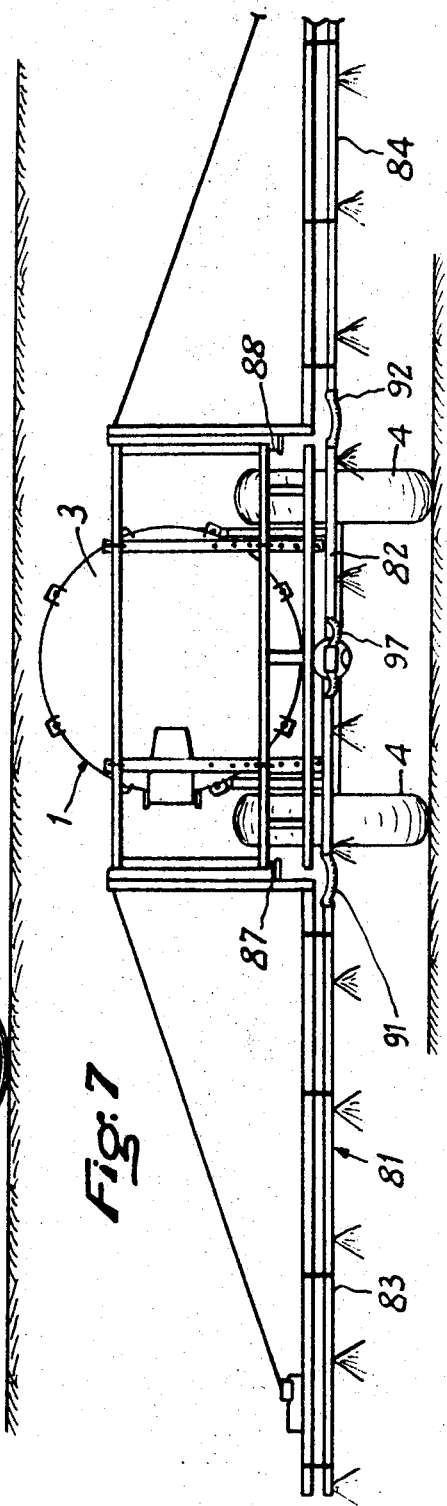

MOBILE DRUM FOR DISTRIBUTING AND SPRAYING

This invention relates to mobile drums which are designed for various types of agricultural work such as, for example, pumping and distributing of liquid manure or else spraying of various products.

The lack of homogeneity of liquid manure has long made it necessary for the purpose of pumping and distribution to make use of leak-tight liquid-manure drums equipped with a compressor and a three-way cock in order to produce a partial vacuum within the drum and to draw the liquid manure from a pit or on the contrary in order to develop a pressure within the drum and thus to improve the distribution by means of a nozzle fitted with a flexible plate. The flow of liquid manure is thus initiated under good conditions inasmuch as it does not have to pass through a pump.

Moreover, when it proves necessary to carry out spraying operations such as, for example, spraying of liquid fertilizers or herbicides, it proves necessary to have recourse to another type of equipment which is specially designed for this purpose, provision being made for a reservoir or tank fitted with a pump which aspirates the liquid contained in the tank and delivers it directly into spray bars fitted with spray nozzles. In fact, in order to carry out the spraying operation, the product must be projected at a low rate of delivery but at a relatively high pressure whereas the process of distribution by means of liquid-manure drums equipped with compressors is carried out only at low pressure and a high rate of delivery. In other words, the characteristics of liquid-manure drums have not made it possible up to the present time to carry out spraying operations. Consequently, farmers have found it necessary up to the present time to have in their possession both liquid-manure drums and sprayers in order to carry out both types of operation.

The aim of the invention is to provide a mobile drum which can be employed indifferently either for distributing liquid manure or for the purpose of spraying liquid fertilizers, herbicides or like products, this result being achieved under the most favorable conditions of efficiency and quality of work.

To this end, the mobile distributing and spraying drum in accordance with the invention is equipped with an air compressor having two operative speeds, namely a speed for distributing at a high rate of delivery and low pressure and a speed for spraying at a lower rate of delivery and high pressure, an adjustable safety valve, a distributing nozzle, spray bars in communication with the interior of the drum and a filler opening fitted with a removable leak-tight plug.

By means of this equipment, the same drum makes it possible to carry out under the best conditions the pumping and distribution of liquid manure or alternatively the spraying of liquid fertilizers, plant protectants or the like at a constant pressure which is determined by the setting given to the safety valve and consequently with a wholly uniform distribution of the product over the ground.

A better understanding of the invention will be gained by consideration of the following description and by reference to the accompanying drawings in which one form of construction of a distributing and spraying drum according to the invention is chosen by way of example.

In these drawings:

FIG. 1 is a profile view of the complete mobile drum unit which is ready for use as a liquid-manure distribution drum;

FIG. 2 is an enlarged detail view of the compressor with portions broken away;

FIG. 3 is a front view corresponding to FIG. 2;

FIGS. 4 and 5 are diagrammatic views of the distribution cock, this view being taken in cross section along line IV–IV of FIG. 2 in two different positions;

FIG. 6 is a view in elevation of the drum of FIG. 1 which is additionally provided with a spraying unit as shown in the folded-back position; and FIG. 7 is a view looking on the rear end and corresponding to FIG. 6, the spray tube being unfolded in the work position.

The liquid-manure drum which is illustrated in FIG. 1 is constituted by a horizontal cylindrical tank 1 which is leak tight and closed at the front end by a fixed end wall 2 and at the rear end by a openable end wall 3. The drum is carried on two wheels 4 and can be hitched to a tractor by means of a drawbar 6 which terminates in a telescopic hitch 7.

There is mounted on top and at the rear of the drum 1 an orientable elbow 11, that is to say an elbow which is capable of rotating in all directions on a circular base 12 fixed on a pipe section 13 which is welded to the drum. There can be connected to the upper extremity of the orientable elbow 11 either a filler hose 15, preferably by means of a quick union 16, or a detachable leak-tight plug 17 (as shown in FIG. 6) which is also of the rapid connection type.

A conventional drain valve 21 (as shown in FIG. 1) is mounted at the lower portion of the openable end wall 3 and fitted with an outlet nozzle 22 fitted with a diffusion plate 23 which is urged elastically by means of a restoring spring 24 against the nozzle extremity which is preferably inclined, said plate being maintained applied against the nozzle in the closed position by said spring when the pressure of the liquid drops within said nozzle.

The valve 21 is remotely operated by means of a link rod system 27, 28 which terminates at the front end of the drum in an operating handle 29 placed within reach of the operator of the tractor to which the drum is hitched.

An air compressor 33 which, in this example, has two cylinders 34, 35 (as also shown in FIGS. 2 and 3) is fixed on the drawbar 6. There is mounted on said compressor a distribution cock 36 (also shown in FIGS. 4 and 5) which comprises a casing 37 with four ducts 41, 42, 43, 44. Said ducts can be put into communication in two different ways by means of a rotatable key 45 provided with two ducts 46, 47 and an operating handle 48 which is capable of selectively taking up two positions at right angles to each other as shown respectively in the two FIGS. 4 and 5.

The duct 43 is in continuous communication with two suction pipes 51, 52 which are connected respectively to the two cylinders 34 and 35 of a compressor. Similarly, the duct 44 is in continuous communication with the two delivery pipes 53, 54 of the two compressor cylinders.

The duct 41 is in continuous communication with the surrounding atmosphere whilst the duct 42 is in communication with one end of a hose 57, the other end of which opens into a settling tank 58 (as shown in FIG. 1). Said tank is in turn connected to the drum by means of a pipe 59 and a valve 61 of conventional type which is designed and arranged to interrupt the communication between the pipe 59 and the interior of the drum when the liquid manure contained in the drum has reached the top of this latter. The settling tank 58 is fitted with a pressure gage 63 which indicates the value of the pressure or partial vacuum. There is shown at 64 an adjustable safety valve which is mounted on top of the drum.

For reasons which will be explained hereinafter, the compressor 33 can be driven at two different speeds, for example respectively of the order of 2,000 r.p.m. and 500 r.p.m. from the power takeoff of the tractor to which the drum is hitched. To this end, the crankshaft 71 of the compressor is fitted with a gearwheel 72 (as shown in FIG. 2) in mesh with another gearwheel 73, the diameter of which is four times larger than that of the gearwheel 72 and which is keyed to a countershaft 74.

One end of a transmission shaft 77 with universal joints is intended to be fixed on the power takeoff shaft of the tractor whilst the other end can be selectively fixed on the splined end of the crankshaft 71 of the compressor if it is desired to drive this latter at low speed or alternatively on the splined end of the countershaft 74 if the compressor is to be driven at high speed.

When it is desired to employ the drum for the purpose of pumping and distributing liquid such as liquid manure in particular, the operation is carried out as follows:

The filler hose 15 being mounted on the orientable elbow 11 and the operating handle of the cock 36 being placed in the position shown in FIG. 5, a vacuum is produced within the interior of the drum when the compressor is started up, with the result that the liquid manure contained, for example, in a pit in which the lower end of the filler hose 15 is immersed is drawn into the drum. It will be noted that the liquid, which is not homogeneous and which contains solid particles in suspension does not require to be passed through a pump in this operation.

The path followed by the liquid from the reservoir at the time of startup is as follows: hose 15, elbow connecter 11, drum 1, valve 61, pipe 59, settling chamber 58, hose 57, ducts 42, 47 and 43 of the cock 36, suction pipes 51 and 52 of the two compressor cylinders, delivery pipes 53 and 54 of said cylinders, pipes 44, 46 and finally the pipe 41 which discharges to the surrounding atmosphere.

If the level of liquid manure were to reach the top portion of the drum, the valve 64 would automatically close, with the result that the liquid would not be liable to reach the compressor.

When the filling operation is completed, the hose 15 is detached and the plug 17 shown in FIG. 6 is placed in position of the elbow connecter 11.

In order to carry out the distributing operation, the operating handle 48 of the distribution cock 36 is moved to the position shown in FIG. 4 so that the compressor draws atmospheric air through the pipes 41, 47, 43, 51 and 52 and delivers the air under pressure through the pipes 53, 54, 44, 46 and 42 into the hose 57 through which the air is conveyed to the settling chamber 58, then to the pipe 59 and into the interior of the drum 1 via the valve 61. The air which is discharged under pressure into the drum causes the flexible plate 23 of the nozzle 22 to be outwardly displaced by the liquid manure which is thus projected onto the ground. Inasmuch as this operation must be carried out at a relatively high rate of delivery, the compressor must necessarily deliver a large volume of air. It is for this reason that, for the distributing operation, the transmission shaft 77 will be fixed on the countershaft 74 which serves to drive the compressor at high speed, as is shown in FIG. 1.

In order to carry out the distributing operation at a relatively high rate of delivery, the pressure within the drum must have a fairly low value of the order of 1 bar, for example. The safety valve 64 will accordingly be adjusted to the corresponding value. Irrespective of the level of liquid contained in the drum, the distributing operation will be carried out at constant pressure, with the result that the liquid will be deposited on the ground in a very uniform manner and under the same conditions throughout the operation.

The drum which has just been described with reference to FIG. 1 can also be employed for spraying liquid fertilizers, herbicides or plant protectants, for example, if the unit is additionally equipped as shown in FIGS. 6 and 7 with a spray bar as generally designated by the reference 81, in which case the orientable elbow 11 is obviously sealed off by the plug 17.

For reasons of convenience, the spray bar 81 is preferably formed in three sections, namely: a central section 82 and two side sections 83, 84, the central section 82 being stationarily mounted at the rear end of the drum whilst the two side sections 83, 84 are hinged to two vertical shafts 87, 88 respectively so that said side sections may be folded flat against the sides of the drum as shown in FIG. 6 whereas, in the working position, said side sections are extended as shown in FIG. 7.

The two side sections of the spray bar are joined to the central section by means of lengths 91, 92 of flexible hose.

The liquid contained in the drum is supplied to the spray bar through a pipe 93 which is connected to the bottom of the drum by means of a flange coupling 94, a valve 95 which is controlled from the tractor, for example by means of the same link rod system 27 as hereinabove described, a settling filter 96 and finally a T-shaped hose pipe, the central arm of which is connected to the outlet of the settling filter 96 whilst the two side arms of said pipe are connected respectively to the two half sections of the central spray bar 82.

As shown in FIG. 6, a section of a pipe 101 is laid flat in the bottom of the drum and is provided with a plurality of drilled holes; said pipe is connected by means of an external pipe 102 and a nonreturn valve 103 to a three-way cock 104 which is mounted in the hose 57 which is connected to the compressor 33.

If the cock 104 is placed in the position shown in chain-dotted lines in FIG. 6, the air delivered by the compressor is conveyed to the pipe 102 and to the perforated pipe 101 which is located inside the drum, in which case the constituents of the liquid contained in the drum are emulsified prior to spraying.

If the cock 104 is placed in the position shown in full lines in FIG. 6, the air delivered by the compressor is conveyed to the top portion of the drum via the settling tank 58 and the valve 61, in which case the liquid to be sprayed is not subjected to any mixing action.

The filling operation is carried out through the top elbowed connecter 11 either under the action of gravity or alternatively by suction when the drum is used for distributing liquid manure as described earlier.

In the case of spraying operations which call for a lower discharge rate than distributing operations, the compressor is driven at low speed and the transmission shaft 77 is accordingly coupled directly to the crankshaft 71 of the compressor as illustrated in FIG. 6.

The safety valve 64 which is calibrated at any desired predetermined pressure makes it possible for the excess air delivered by the compressor 33 to pass to the exterior of the drum, with the result that a constant pressure always prevails within said drum and that wholly uniform distribution of the product over the ground is thus ensured.

The spray bars can be of different types and usually equipped with deflecting nozzles for low-pressure operation or alternatively with pencil jet nozzles, flat spray nozzles or the like, depending on the nature of the liquid to be distributed. The quantity of liquid distributed per acre is determined on the one hand by the diameter of the nozzle holes of the spray bar and on the other hand by the pressure developed within the drum, for example approximately 0.2 to 4 kg./cm.$^2$ according to the setting given to the safety valve. A pressure of the order of 1 kg./cm.$^2$ is frequently adopted. The output can obviously be varied as a function of the forward speed of the tractor which draws the drum.

In conclusion, it is apparent that the same apparatus can be employed in two different ways, namely as a liquid-manure drum or as a spraying unit, depending on the types of equipment which are put in service or which are mounted on the drum.

It will be understood that the invention is not limited to the form of construction hereinabove described with reference to the drawings and that any modifications may accordingly be contemplated without thereby departing either from the scope or the spirit of the invention.

For example, it accordingly follows from the foregoing that it would be possible to employ any known means other than a modification of the speed at which the compressor is driven for the purpose of operating this latter selectively within two different speed ranges, namely a speed range for distributing at a high rate of delivery and a low pressure and a speed range for spraying at a low rate of delivery but at a pressure which can frequently be of a higher value.

I claim:

1. A mobile drum for distributing liquid manure and spraying liquid products such as fertilizers, plant protectants or the like, said drum being equipped with an air compressor having two operative speeds, namely a speed for distributing at a high rate of delivery and low pressure and a speed for spraying at a lower rate of delivery and high pressure, an adjustable safety valve, a distributing nozzle, spray bars in communication with the interior of the drum and a filler opening fitted with a removable leak-tight plug, said compressor including a first shaft end which is coupled with the compressor shaft and a second shaft end which is coupled with a countershaft, said countershaft being coupled with the compressor shaft by means of a reduction gear train, the shaft ends being adapted to receive one end of a transmission shaft and the other end of said shaft being adapted to be coupled with the power takeoff shaft of a tractor.

2. A mobile liquid-distributing spray device, comprising a movable assembly including a drum for the liquid and air compressor connected to said drum for applying a liquid distribution pressure to said drum, means including two separate takeoff shafts associated with said compressor for selectively driving said compressor at at least two distinct operative speeds for delivering the liquid at a selected rate of delivery, and a spray bar connected to said drum for discharging the liquid from the drum in a spray at a rate in accordance with the pressure on said drum produced by said compressor.

3. A mobile liquid distributing spray device, according to claim 2, including a pipe connected to the bottom of said drum having a settling filter, said pipe being connected to said spray bar.

4. A mobile liquid-distributing spray device, according to claim 2, including a wheeled platform carrying said drum having a drawbar hitch for connecting the platform to a driving tractor, said means for selectively driving said compressor including a compressor drive shaft, first and second takeoff shafts selectively engageable with said drive shaft, said takeoff shafts being exposed in a position for selective engagement for driving the compressor from the tractor.